Patented June 29, 1954

2,682,559

UNITED STATES PATENT OFFICE 2,682,559

PURIFICATION OF HYDROXYBENZO-PHENONES

Lester N. Stanley, Delmar, and Alois C. Baggenstoss, East Greenbush, N. Y., assignors to General Aniline & Film Corporation, New York, N. Y., a corporation of Delaware No Drawing. Application June 16, 1951,
Serial No. 232,058

11 Claims. (Cl. 260—591)

This invention relates to hydroxybenzophenones and particularly to a method of purifying the same.

It is known that hydroxybenzophenones, i. e., mono-, di-, tri-, and tetrahydroxybenzophenones are commercially useful compounds. A substantial majority of them are utilized as anti-oxidants in practically any type of organic material which is susceptible to oxidation and deterioration by absorption of oxygen from the air. A great number of them are also utilized as absorbents for ultraviolet light in various transparent sheet materials and for the stabilization of transparent plastics. When such compounds are utilized either as anti-oxidants or ultraviolet absorbers, especially in substantially colorless materials, such as plastics, resins, film forming materials, including colored textiles, and the like, it is extremely important that the compounds be of the highest degree of purity and stability upon storage.

Practically all of the hydroxybenzophenones commercially available and those prepared by prior art methods are slightly colored substances and have a tendency to deteriorate on exposure to air and prolonged storage, even in closed containers. In some cases, colorless plastics and the like coated with colorless resins and film forming materials containing the hydroxybenzophenones become colored after several months, and in other cases slightly colored plastics or film forming material are discolored when exposed to ultraviolet light. The discoloration and darkening in color is particularly prominent in neutral and alkaline medium. It is presumed that these undesirable properties are due to the presence of one or more hydroxy groups in the benzophenone, notwithstanding the recognition by the art of the inherent acidity of such compounds due to the presence of phenolic hydroxy groups and the fact that their synthesis is carried out under predominantly acid conditions.

We have discovered that hydroxybenzophenones in general can be purified to an extremely high degree of purity and stability on storage, and when incorporated into substantially colorless organic materials and film forming materials either as anti-oxidants, ultraviolet absorbers, or both, do not discolor the materials nor develop any color of their own.

Accordingly, it is an object of the present invention to provide a simple and inexpensive method of purifying hydroxybenzophenones.

Other objects and advantages will appear hereinafter.

The hydroxybenzophenones which may be purified to an extremely high degree of purity and stability on storage are those characterized by the following general formulae:

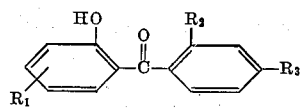

and

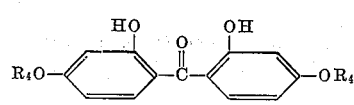

wherein $R_1$ is hydrogen, hydroxy, lower alkyl, e. g., methyl, ethyl, propyl, butyl, etc., or lower alkoxy, e. g., methoxy, ethoxy, propoxy, butoxy, etc., $R_2$ and $R_3$ are either hydrogen, hydroxy, or lower alkoxy of the same value as in $R_1$, and $R_4$ is an alkyl group, e. g., methyl, ethyl, propyl, isopropyl, butyl, isobutyl, amyl, isoamyl, hexyl, heptyl, octyl, octadecyl, lauryl, and the like.

The following are specific examples of hydroxybenzophenones which have been purified in accordance with the process of the present invention:

(1) 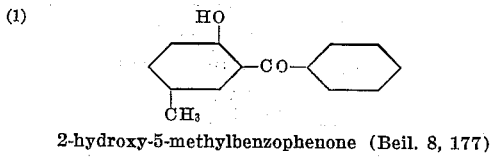

2-hydroxy-5-methylbenzophenone (Beil. 8, 177)

(2) 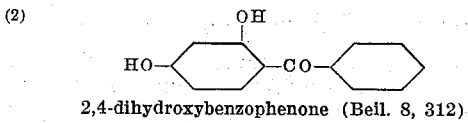

2,4-dihydroxybenzophenone (Beil. 8, 312)

(3) 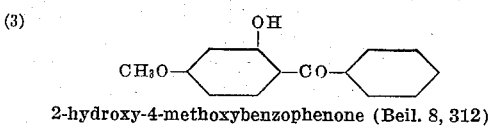

2-hydroxy-4-methoxybenzophenone (Beil. 8, 312)

(4) 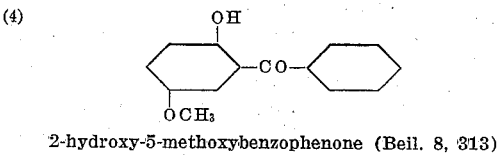

2-hydroxy-5-methoxybenzophenone (Beil. 8, 313)

(5) 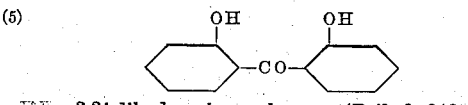

2,2'-dihydroxybenzophenone (Beil. 8, 313)

(6) 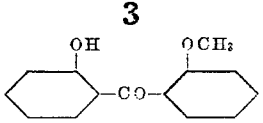
2-hydroxy-2'-methoxybenzophenone (Beil. 8, 314)

(7) 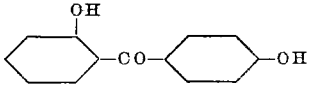
2,4'-dihydroxybenzophenone (Beil. 8, 315)

(8) 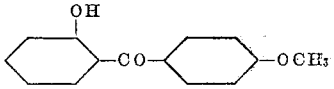
2-hydroxy-4'-methoxybenzophenone (Beil. 8, 315)

(9) 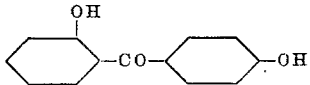
2,4'-dihydroxy-5-methylbenzophenone (Beil. 8, 322)

(10) 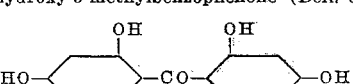
2,2',4,4'-tetrahydroxybenzophenone (Beil. 8, 496)

(11) 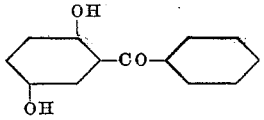
2,5-dihydroxybenzophenone (Beil. 2nd. erganz. 8, 353)

(12) 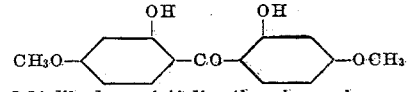
2,2'-dihydroxy-4,4'-dimethoxybenzophenone

(13) 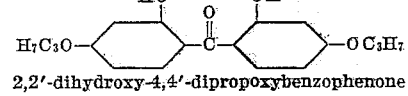
2,2'-dihydroxy-4,4'-dipropoxybenzophenone

(14) 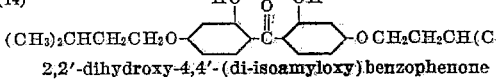
2,2'-dihydroxy-4,4'-(di-isoamyloxy)benzophenone

(15) 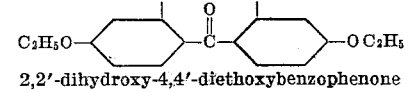
2,2'-dihydroxy-4,4'-diethoxybenzophenone

(16) 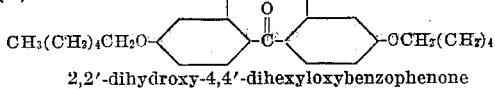
2,2'-dihydroxy-4,4'-dihexyloxybenzophenone

The latter five compounds and homologs of 2,2'-dihydroxy-4,4'-dialkoxybenzophenones, are prepared according to the process described in the application of Paul E. Hoch, Serial No. 214,828, filed on March 9, 1951.

The process involved in purifying the hydroxybenzophenones is carried out by first dissolving the hydroxybenzophenone in a sufficient amount of an aliphatic ketone of from 3 to 6 carbon atoms or in a lower alcohol, lower glycol, or lower glycol ether to effect solution. The amount of the ketone, alcohol, glycol, or glycol ether is not material. However, for practical purposes, we have found that 1 part by weight of the hydroxybenzophenone and from 7 to 10 parts by weight of the ketone, alcohol, glycol or glycol ether is sufficient to effect complete solution of the hydroxybenzophenone. To the ketone, alcohol, glycol, or glycol ether solution, 0.02 to 0.06 part by weight of hydrochloric acid, preferably of 30% concentration, and from 8 to 12 parts by weight of either an aromatic monobasic acid of from 7 to 9 carbon atoms or an open chain polybasic acid of from 2 to 9 carbon atoms are added. If desired, 25 to 35 parts by weight of Nuchar (activated carbon), Filtercel, or any other decolorizing medium may be added to the ketone, alcohol, glycol, or glycol ether-acid solution. The solution is stirred and filtered into 2½ to 3 parts by volume of water containing 40 to 60 parts by weight of hydrochloric acid of 30% concentration, and 8 to 12 parts by weight of the aforesaid aromatic monobasic acid or open chain polybasic acid. During the latter step a precipitate is formed and the precipitated product is then filtered and dried by conventional means, preferably vacuum dried at 45° C. Should it be desired to obtain a product having a higher degree of purity, the solution and filtration steps can be repeated two or three times. For practical purposes, once is sufficient to obtain products which are white to pale yellow in color, have a high degree of purity, and will withstand deterioration upon long storage.

As examples of aromatic monobasic acids of 7 to 9 carbon atoms and open chain polybasic acids of 2 to 9 carbon atoms, the following may be mentioned. It is to be understood that these examples are merely illustrative and are not to be construed as limitative.

Aromatic acids:
 Benzoic
 Salicyclic
 o, m, and p-Toluic
 Phenylacetic
 2,3-xylic acid
 2,4-xylic acid
 2,5-xylic acid
 3,4-xylic acid
 3,5-xylic acid Polybasic open chain acids:
 Oxalic
 Tartronic
 Malonic
 Succinic
 Malic
 Tartaric
 Glutaric
 Methylsuccinic
 Citric
 Tricarballylic
 Pimelic The following are illustrative examples of aliphatic ketones of from 3 to 6 carbon atoms, lower alcohols, lower glycols, and lower glycol ethers and mixtures thereof which may be utilized in effectuating the solution of the hydroxybenzophenone.

Ketones:
 Acetone
 Ethylmethyl ketone
 Biacetyl
 Acetylacetone
 Acetonylacetone

Alcohols:
 Methanol
 Ethanol
 Propanol
 Isopropanol
 n-Butanol
 Sec.-butanol
 Tert.-butanol Glycols and glycol ethers:
Ethylene glycol
Propylene glycol
Trimethylene glycol
Dimethylethylene glycol
Tetramethylene glycol
Ethylene glycol monomethyl ether
Ethylene glycol monoethyl ether
1,3-dioxane
1,4-dioxane The following examples illustrate the method utilized in purifying hydroxybenzophenones of the foregoing formulae. All parts are by weight.

*Example I*

214 parts of 2,4-dihydroxybenzophenone were charged into 1750 parts of acetone, 10 parts of hydrochloric acid of 30% concentration, 25 parts of oxalic acid, and 70 parts of activated carbon. The charge was stirred well and filtered into 5400 parts of water containing 10 parts of hydrochloric acid of 30% concentration, and 25 parts of oxalic acid. The precipitated product was filtered and then vacuum dried at 45° C. The dried product was white in color, has a high degree of purity, and withstood deterioration on storage in a closed container for over 6 months.

*Example II*

214 parts of 2,2'-dihydroxybenzophenone were charged into 1500 parts of ethylmethyl ketone, 10 parts of hydrochloric acid of 30% concentration, 20 parts of malonic acid, and 50 parts of Filtercel. The charge was stirred well and filtered into 6000 parts of water containing 10 parts of hydrochloric acid of 30% concentration, and 20 parts of malonic acid. The precipitated product was filtered and vacuum dried at 45° C. The dried product is very white in color, has a high degree of purity, and withstood deterioration on storage in a closed container for over 6 months.

*Example III*

274 parts of 2,2'-dihydroxy-4,4'-dimethoxybenzophenone were charged into 1400 parts of isopropanol, 10 parts of hydrochloric acid of 30% concentration, 23 parts of succinic acid, and 50 parts of Nuchar. The charge was well stirred and filtered into 5000 parts of water containing 10 parts of hydrochloric acid of 30% concentration and 23 parts of succinic acid. The precipitated product was filtered, then vacuum dried at 45° C. The dried product is pale yellow in color, has a high degree of purity, and withstood deterioration on storage in a closed container for over 6 months.

*Example IV*

246 parts of 2,2',4,4'-tetrahydroxybenzophenone were charged into 1500 parts of biacetyl, 10 parts of hydrochloric acid of 30% concentration, 25 parts of citric acid, and 40 parts of Nuchar. The charge was well stirred and filtered into 6500 parts of water containing 10 parts of hydrochloric acid of 30% concentration and 25 parts of citric acid. The precipitated product was filtered, then vacuum dried at 45° C. The dried product is white in color, has a high degree of purity, and withstood deterioration on storage in a closed container for over 6 months.

*Example V*

214 parts of 2,4-dihydroxybenzophenone were charged into 1000 parts of ethyl alcohol, 8 parts of hydrochloric acid of 30% concentration, 40 parts of benzoic acid, and 70 parts of Nuchar. The charge was well stirred and filtered into 5000 parts of water containing 8 parts of hydrochloric acid of 30% concentration and 40 parts of benzoic acid. The precipitated product was filtered, then vacuum dried at 45° C. The dried product is very white in color, has a high degree of purity, and withstood deterioration on storage in a closed container for over 6 months.

While we have disclosed the preferred embodiments of our invention, it will be readily appreciated that many variations and changes may be made without departing from the spirit and scope thereof. Accordingly, the scope of the invention is to be limited solely by the appended claims.

We claim:

1. The process of purifying hydroxybenzophenones selected from the class consisting of those of the following formulae:

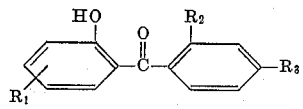

and

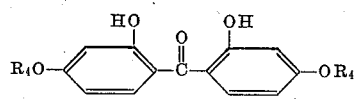

wherein $R_1$ represents a member selected from the group consisting of hydrogen, hydroxy, lower alkyl, and lower alkoxy, $R_2$ and $R_3$ represent a member selected from the group consisting of hydrogen, hydroxy, and lower alkoxy, and $R_4$ represents an alkyl group, which comprises filtering a solution of the hydroxybenzophenone in a member selected from the group consisting of an alphatic ketone of 3 to 6 carbon atoms, lower alcohol, lower glycol, and lower glycol ether, and mixtures thereof, containing hydrochloric acid and an carboxylic organic acid selected from the class consisting of aromatic monobasic acids of 7 to 9 carbon atoms and open chain polybasic acids of 2 to 9 carbon atoms into an aqueous solution containing hydrochloric acid and aforesaid carboxylic organic acid, filtering the precipitated hydroxybenzophenone from the said aqueous solution, and drying the same.

2. The process of purifying 2,4-dihydroxybenzophenone which comprises filtering a solution thereof in a member selected from the group consisting of an aliphatic ketone of 3 to 6 carbon atoms lower alcohol, lower glycol, and lower glycol ether, and mixtures thereof, containing hydrochloric and oxalic acid into an aqueous solution containing hydrochloric and oxalic acids, filtering the precipitated 2,4-dihydroxybenzophenone from the said aqueous solution, and drying the same.

3. The process of purifying 2,2'-dihydroxybenzophenone which comprises filtering a solution thereof in a member selected from the group consisting of an aliphatic ketone of 3 to 6 carbon atoms lower alcohol, lower glycol, and lower glycol ether, and mixtures thereof, containing hydrochloric and malonic acids into an aqueous solution containing hydrochloric and malonic acids, filtering the precipitated 2,2'-dihydroxybenzophenone from the said aqueous solution, and drying the same.

4. The process of purifying 2,2'-dihydroxy-4,4'-dimethoxybenzophenone which comprises filtering a solution thereof in a member selected from the group consisting of an aliphatic ketone of 3 to 6 carbon atoms lower alcohol, lower glycol, and lower glycol ether, and mixtures thereof, containing hydrochloric and succinic acids into an aqueous solution containing hydrochloric and succinic acids, filtering the precipitated 2,2'-dihydroxy-4,4'-dimethoxybenzophenone from the said aqueous solution, and drying the same.

5. The process of purifying 2,2',4,4'-tetrahydroxybenzophenone which comprises filtering a solution thereof in a member selected from the group consisting of an aliphatic ketone of 3 to 6 carbon atoms lower alcohol, lower glycol, and lower glycol ether, and mixtures thereof, containing hydrochloric and citric acids into an aqueous solution containing hydrochloric and citric acids, filtering the precipitated 2,2',4,4'-tetrahydroxybenzophenone from the said aqueous solution, and drying the same.

6. The process of purifying 2,4-dihydroxybenzophenone which comprises filtering a solution thereof in a member selected from the group consisting of an aliphatic ketone of 3 to 6 carbon atoms lower alcohol, lower glycol, and lower glycol ether, and mixtures thereof, containing hydrochloric and benzoic acids into an aqueous solution containing hydrochloric and benzoic acids, filtering the precipitated 2,4-dihydroxybenzophenone from the said aqueous solution, and drying the same.

7. The process according to claim 2, wherein the aliphatic ketone is acetone.

8. The process according to claim 1, wherein the aliphatic ketone is ethylmethyl ketone.

9. The process according to claim 1, wherein the lower alcohol is isopropanol.

10. The process according to claim 1, wherein the lower alcohol is ethanol.

11. The process according to claim 1, wherein the aliphatic ketone is biacetyl.

References Cited in the file of this patent

UNITED STATES PATENTS

| Number | Name | Date |
|---|---|---|
| 2,341,851 | Adams | Feb. 15, 1944 |
| 2,419,553 | Houtman | Apr. 29, 1947 |
| 2,552,591 | Rueggeberg et al. | May 15, 1951 |
| 2,590,813 | Britton | May 25, 1952 |